(12) United States Patent
Li et al.

(10) Patent No.: US 11,054,508 B2
(45) Date of Patent: Jul. 6, 2021

(54) HIGH RESOLUTION LIDAR USING HIGH FREQUENCY PULSE FIRING

(71) Applicant: INNOVUSION IRELAND LIMITED, Los Altos, CA (US)

(72) Inventors: Yimin Li, Los Altos, CA (US); Junwei Bao, Los Altos, CA (US)

(73) Assignee: INNOVUSION IRELAND LIMITED, Los Altos, CA (US)

( * ) Notice: Subject to any disclaimer, the term of this patent is extended or adjusted under 35 U.S.C. 154(b) by 270 days.

(21) Appl. No.: 15/857,563

(22) Filed: Dec. 28, 2017

(65) Prior Publication Data

US 2018/0188357 A1 Jul. 5, 2018

Related U.S. Application Data

(60) Provisional application No. 62/442,912, filed on Jan. 5, 2017.

(51) Int. Cl.
*G01S 7/481* (2006.01)
*G01S 7/484* (2006.01)
(Continued)

(52) U.S. Cl.
CPC ............ *G01S 7/4865* (2013.01); *G01S 7/484* (2013.01); *G01S 7/4817* (2013.01); *G01S 7/4861* (2013.01); *G01S 17/10* (2013.01)

(58) Field of Classification Search
CPC ...... G01S 7/4865; G01S 17/10; G01S 7/4817; G01S 7/484; G01S 7/4861; G01S 7/4816;
(Continued)

(56) References Cited

U.S. PATENT DOCUMENTS 5,006,721 A 4/1991 Cameron
5,157,451 A 10/1992 Taboada
(Continued)

FOREIGN PATENT DOCUMENTS

EP 2889642 A1 7/2015
GB 2000411 A 1/1979
(Continued)

OTHER PUBLICATIONS

EP2889642 Description translation, created Oct. 3, 2020 from application dated Nov. 11, 2014, 27 pp. (Year: 2020).*
(Continued)

*Primary Examiner* — Daniel L Murphy
(74) *Attorney, Agent, or Firm* — Morrison & Foerster LLP

(57) ABSTRACT

In accordance with some embodiments, a light detection and ranging (LiDAR) scanning system includes a light source. The light source is configured to transmit a pulse of light. The LiDAR scanning system also includes a beam steering apparatus configured to steer the pulse of light in at least one of vertically and horizontally along an optical path. The beam steering apparatus is further configured to concurrently collect scattered light generated based on the light pulse illuminating an object in the optical path. The scattered light is coaxial or substantially coaxial with the optical path. The LiDAR scanning system further includes a light converging apparatus configured to direct the collected scattered light to a focal point. The LiDAR scanning system further includes a light detector, which is situated substantially at the focal point. In some embodiments, the light detector can include an array of detectors or detector elements.

15 Claims, 6 Drawing Sheets

(51) Int. Cl.
  *G01S 7/486*    (2020.01)
  *G01S 17/10*    (2020.01)
  *G01S 7/4865*   (2020.01)
  *G01S 7/4861*   (2020.01)

(58) Field of Classification Search
  CPC ........ G01S 17/42; G01S 7/487; G01S 7/4863; G01S 7/4818; G01S 17/46
  USPC ...................................................... 356/5.01
  See application file for complete search history.

(56) References Cited

U.S. PATENT DOCUMENTS

| | | |
|---|---|---|
| 5,442,358 A | 8/1995 | Keeler |
| 5,657,077 A | 8/1997 | Deangelis |
| 5,926,259 A | 7/1999 | Bamberger |
| 6,163,378 A | 12/2000 | Khoury |
| 6,594,000 B2 | 7/2003 | Green |
| 6,650,404 B1 | 11/2003 | Crawford |
| 6,950,733 B2 | 9/2005 | Stopczynski |
| 7,202,941 B2 | 4/2007 | Munro |
| 7,440,084 B2 | 10/2008 | Kane |
| 7,440,175 B2 | 10/2008 | Di Teodoro |
| 7,489,865 B2 | 2/2009 | Varshneya |
| 7,576,837 B2 | 8/2009 | Liu |
| 7,830,527 B2 | 11/2010 | Chen |
| 7,835,068 B1 | 11/2010 | Brooks |
| 7,847,235 B2 | 12/2010 | Krupkin |
| 7,936,448 B2 | 5/2011 | Albuquerque |
| 7,969,558 B2 | 6/2011 | Hall |
| 7,982,861 B2 | 7/2011 | Abshire |
| 8,072,582 B2 | 12/2011 | Meneely |
| 8,471,895 B2 | 6/2013 | Banks |
| 8,736,818 B2 | 5/2014 | Weimer |
| 8,749,764 B2 | 6/2014 | Hsu |
| 8,812,149 B2 | 8/2014 | Doak |
| 9,048,616 B1 | 6/2015 | Robinson |
| 9,086,273 B1 | 7/2015 | Gruver |
| 9,194,701 B2 | 11/2015 | Bösch |
| 9,255,790 B2 | 2/2016 | Zhu |
| 9,300,321 B2 | 3/2016 | Zalik |
| 9,354,485 B2 | 5/2016 | Fermann |
| 9,510,505 B2 | 12/2016 | Halloran |
| 9,575,184 B2 | 2/2017 | Gilliland |
| 9,605,998 B2 | 3/2017 | Nozawa |
| 9,621,876 B2 | 4/2017 | Federspiel |
| 9,638,799 B2 | 5/2017 | Goodwin |
| 9,696,426 B2 | 7/2017 | Zuk |
| 9,702,966 B2 | 7/2017 | Batcheller |
| 9,823,353 B2 | 11/2017 | Eichenholz |
| 9,869,754 B1 | 1/2018 | Campbell |
| 9,880,263 B2 | 1/2018 | Droz |
| 9,885,778 B2 | 2/2018 | Dussan |
| 9,915,726 B2 | 3/2018 | Bailey |
| 9,927,915 B2 | 3/2018 | Frame |
| 10,073,166 B2 | 9/2018 | Dussan |
| 10,157,630 B2 | 12/2018 | Vaughn |
| 10,215,847 B2 | 2/2019 | Scheim |
| 10,557,923 B2 | 2/2020 | Watnik |
| 10,591,600 B2 | 3/2020 | Villeneuve |
| 10,969,475 B2 | 4/2021 | Li et al. |
| 2002/0136251 A1 | 9/2002 | Green |
| 2004/0135992 A1 | 7/2004 | Munro |
| 2005/0033497 A1 | 2/2005 | Stopczynski |
| 2006/0071846 A1 | 4/2006 | Yanagisawa et al. |
| 2006/0132752 A1 | 6/2006 | Kane |
| 2007/0091948 A1 | 4/2007 | Di Teodoro |
| 2008/0174762 A1 | 7/2008 | Liu |
| 2009/0010644 A1 | 1/2009 | Varshneya |
| 2009/0051926 A1 | 2/2009 | Chen |
| 2009/0059201 A1 | 3/2009 | Willner |
| 2009/0147239 A1 | 6/2009 | Zhu |
| 2009/0262760 A1 | 10/2009 | Krupkin |
| 2010/0006760 A1 | 1/2010 | Lee |
| 2010/0020306 A1 | 1/2010 | Hall |
| 2010/0027602 A1 | 2/2010 | Abshire |
| 2010/0045965 A1 | 2/2010 | Meneely |
| 2010/0128109 A1 | 5/2010 | Banks |
| 2010/0271614 A1 | 10/2010 | Albuquerque |
| 2012/0038903 A1 | 2/2012 | Weimer |
| 2012/0124113 A1 | 5/2012 | Zalik |
| 2012/0221142 A1 | 8/2012 | Doak |
| 2013/0107016 A1 | 5/2013 | Federspiel |
| 2013/0293867 A1 | 11/2013 | Hsu |
| 2013/0293946 A1 | 11/2013 | Fermann |
| 2014/0078514 A1 | 3/2014 | Zhu |
| 2014/0347650 A1 | 11/2014 | Bosch |
| 2014/0350836 A1 | 11/2014 | Stettner et al. |
| 2015/0078123 A1 | 3/2015 | Batcheller |
| 2015/0084805 A1 | 3/2015 | Dawber |
| 2015/0116692 A1 | 4/2015 | Zuk |
| 2015/0139259 A1 | 5/2015 | Robinson |
| 2015/0355327 A1 | 12/2015 | Goodwin |
| 2016/0003946 A1 | 1/2016 | Gilliland |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran |
| 2016/0117048 A1 | 4/2016 | Frame |
| 2016/0245902 A1 | 8/2016 | Watnik |
| 2016/0291134 A1 | 10/2016 | Droz |
| 2016/0313445 A1 | 10/2016 | Bailey |
| 2016/0327646 A1 | 11/2016 | Scheim |
| 2017/0153319 A1 | 6/2017 | Villeneuve |
| 2017/0299721 A1 | 10/2017 | Eichenholz |
| 2018/0158471 A1 | 6/2018 | Vaughn |
| 2018/0188355 A1 | 7/2018 | Bao |
| 2018/0188357 A1 | 7/2018 | Li |
| 2018/0188358 A1 | 7/2018 | Li |
| 2018/0188371 A1 | 7/2018 | Bao |
| 2018/0275274 A1 | 9/2018 | Bao |
| 2019/0025428 A1 | 1/2019 | Li |
| 2019/0120942 A1 | 4/2019 | Zhang |
| 2019/0257924 A1 | 8/2019 | Li |
| 2019/0265334 A1 | 8/2019 | Zhang |
| 2019/0265336 A1 | 8/2019 | Zhang |
| 2019/0265337 A1 | 8/2019 | Zhang |
| 2019/0265339 A1 | 8/2019 | Zhang |

FOREIGN PATENT DOCUMENTS

| | | | |
|---|---|---|---|
| WO | 2018129408 A1 | 7/2018 |
| WO | 2018129409 A1 | 7/2018 |
| WO | 2018129410 A1 | 7/2018 |
| WO | 2018175990 A1 | 9/2018 |
| WO | 2018182812 A2 | 10/2018 |
| WO | 2019079642 A1 | 4/2019 |
| WO | WO2019165095 A1 | 8/2019 |
| WO | WO2019165289 A1 | 8/2019 |
| WO | WO2019165294 A1 | 8/2019 |
| WO | 2020013890 A2 | 1/2020 |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.

International Preliminary Report on Patentability and Written Opinion of the International Searching Authority, dated Sep. 18, 2018, for PCT Application No. PCT/US2018/12116, filed Jan. 2, 2018, 11 pages.

International Preliminary Report on Patentability, and Written Opinion dated Jul. 9, 2019, for PCT Application No. PCT/US2018/012703, filed Jan. 5, 2018, 10 pages.

(56) References Cited

OTHER PUBLICATIONS

International Preliminary Report on Patentability, dated Jul. 9, 2019, for PCT Application No. PCT/US2018/012704, filed Jan. 5, 2018, 7 pages.
International Preliminary Report on Patentability, dated Jul. 9, 2019, for PCT Application No. PCT/US2018/012705, filed Jan. 5, 2018, 7 pages.
International Search Report and Written Opinion, dated Jul. 9, 2019, for PCT Application No. PCT/US2019/18987, 17 pages.
International Search Report and Written Opinion, dated May 3, 2019, for PCT Application No. PCT/US2019/19272, 16 pages.
International Search Report and Written Opinion, dated May 6, 2019, for PCT Application No. PCT/US2019/19264, 15 pages.
International Search Report and Written Opinion, dated Jan. 3, 2019, for PCT Application No. PCT/US2018/056577, nine pages.
International Search Report, dated Jun. 7, 2018, for PCT Application No. PCT/US2018/24185, filed Mar. 23, 2018, 2 pages.
International Search Report, dated Mar. 19, 2018, for PCT Application No. PCT/US2018/012705, filed Jan. 5, 2018, 2 pages.
International Search Report, dated Mar. 20, 2018, for PCT Application No. PCT/US2018/012703, filed Jan. 5, 2018, 2 pages.
International Search Report, dated Mar. 23, 2018, for PCT Application No. PCT/US2018/012704, filed Jan. 5, 2018, pages.
International Search Report, dated Sep. 18, 2018, for PCT Application No. PCT/US2018/12116, filed Jan. 2, 2018, 2 pages.
Written Opinion of the International Searching Authority, dated Jun. 7, 2018, for PCT Application No. PCT/US2018/24185, filed Mar. 23, 2018, 5 pages.
Written Opinion of the International Searching Authority, dated Mar. 19, 2018, for PCT Application No. PCT/US2018/012705, filed Jan. 5, 2018, 6 pages.
Written Opinion of the International Searching Authority, dated Mar. 20, 2018, for PCT Application No. PCT/US2018/012703, filed Jan. 5, 2018, 9 pages.
Written Opinion of the International Searching Authority, dated Mar. 23, 2018, for PCT Application No. PCT/US2018/012704, filed Jan. 5, 2018, 6 pages.
International Search Report and Written Opinion, dated Jan. 17, 2020, for PCT Application No. PCT/US19/19276, 14 pages.
International Preliminary Report on Patentability dated Apr. 30, 2020, for PCT Application No. PCT/US2018/056577, eight pages.
Non-Final Office Action dated Apr. 1, 2020, for U.S. Appl. No. 15/857,566, filed Dec. 28, 2017, twenty one pages.
Non-Final Office Action dated Apr. 30, 2020, for U.S. Appl. No. 15/860,598, filed Jan. 2, 2018, thirteen pages.
Non-Final Office Action dated Jun. 2, 2020, for U.S. Appl. No. 15/934,807, filed Mar. 23, 2018, thirteen pages.
Non-Final Office Action dated Mar. 30, 2020, for U.S. Appl. No. 15/863,695, filed Jan. 5, 2018, eight pages.
European Search Report, dated Jul. 17, 2020, for EP Application No. 18776977.3, twelve pages.
Extended European Search Report, dated Jul. 10, 2020, for EP Application No. 18736738.8, nine pages.
Gunzung Kim, et al. (Mar. 2, 2016). "A hybrid 3D LIDAR imager based on pixel-by-pixel scanning and DS-OCDMA," Proceedings of SPIE; [Proceedings of SPIE ISSN 0277-786X vol. 10524], SPIE, US, vol. 9751, pp. 975119-1-975119-8.
Extended European Search Report, dated Jul. 22, 2020, for EP Application No. 18736685.1, ten pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.
Notice of Allowance dated Mar. 26, 2021, for U.S. Appl. No. 15/857,566, filed Dec. 28, 2017, ten pages.
Non-Final Office Action dated Feb. 18, 2021, for U.S. Appl. No. 15/860,598, filed Jan. 2, 2018, thirteen pages.
Non-Final Office Action dated Dec. 16, 2020, for U.S. Appl. No. 15/857,566, filed Dec. 28, 2017, eight pages.
Notice of Allowance dated Dec. 2, 2020, for U.S. Appl. No. 15/863,695, filed Jan. 5, 2018, five pages.
Notice of Allowance, (corrected) dated Jan. 8, 2021, for U.S. Appl. No. 15/863,695, filed Jan. 5, 2018, two pages.

* cited by examiner

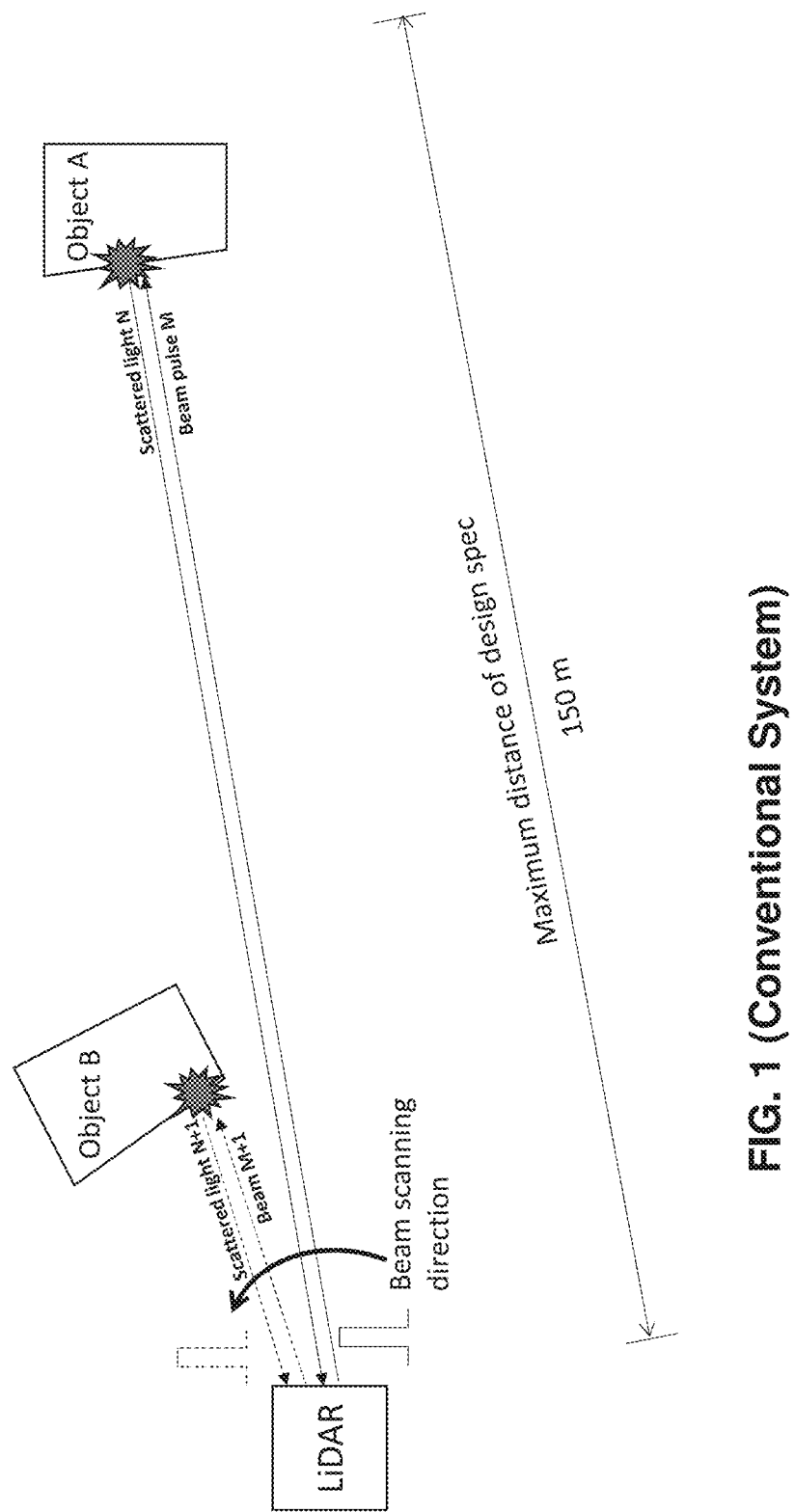
FIG. 1 (Conventional System)

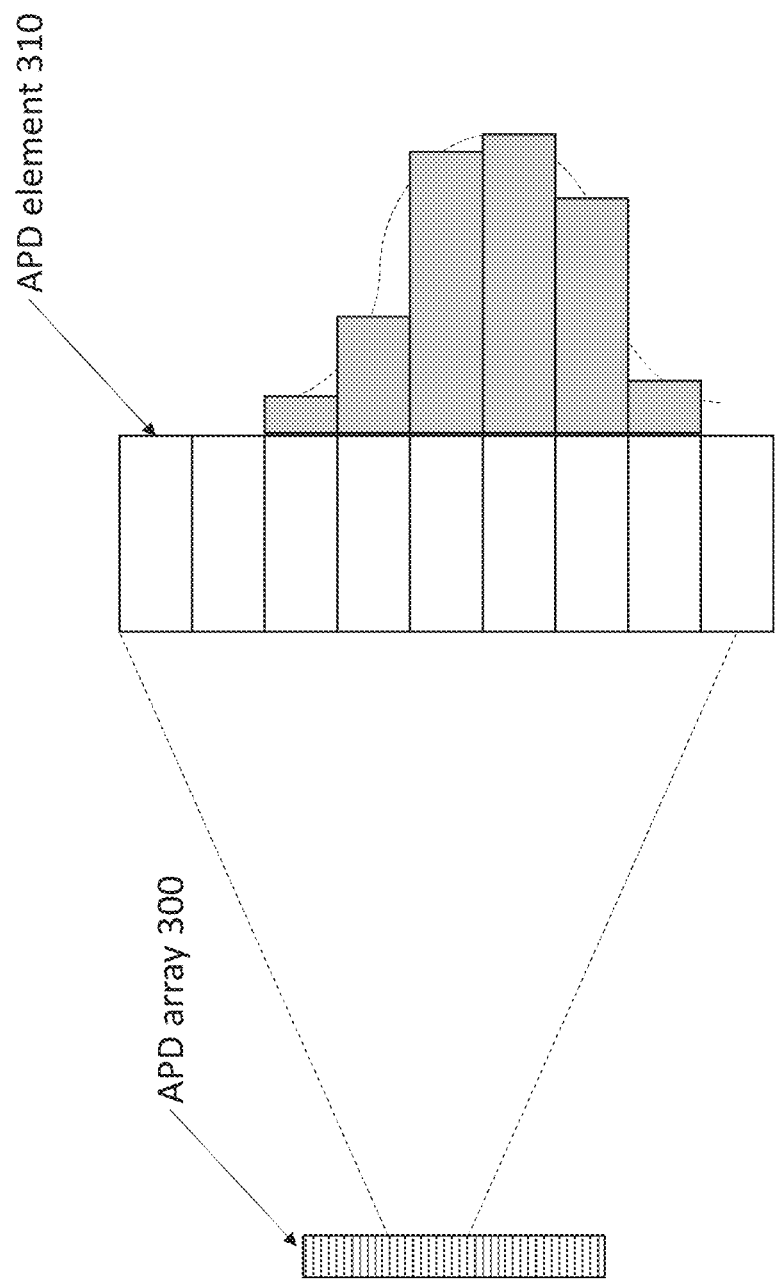

HIGH RESOLUTION LIDAR USING HIGH FREQUENCY PULSE FIRING

CROSS-REFERENCE TO RELATED APPLICATIONS

This application claims priority to U.S. Provisional Patent Application No. 62/442,912, entitled "HIGH RESOLUTION LiDAR USING HIGH FREQUENCY PULSE FIRING", filed on Jan. 5, 2017, the content of which is hereby incorporated by reference in its entirety.

FIELD OF THE DISCLOSURE

The present disclosure generally relates to a light detection and ranging (LiDAR) system and, more specifically, to systems and methods for achieving high resolution in the field of view using high frequency pulse generation and detection.

BACKGROUND OF THE DISCLOSURE

A LiDAR system can be used to measure the distance between an object and the system. Specifically, the system can transmit a signal (e.g., using a light source), record a returned signal (e.g., using light detectors), and determine the distance by calculating the delay between the returned signal and the transmitted signal.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) scanning system can include a light source. The light source is configured to transmit one or more light pulses. The LiDAR scanning system can also include a beam steering apparatus configured to steer the pulse of light in at least one of vertical and horizontal directions along an optical path. The beam steering apparatus is further configured to concurrently collect the scattered light generated based on the light pulse illuminating an object in the optical path. The scattered light can be coaxial or substantially coaxial with the optical path. The LiDAR scanning system can further include a light converging apparatus configured to direct the collected scattered light to a focal point or plane. The LiDAR scanning system can further include a light detector, which can be disposed at or in proximity to the focal point or plane. In some embodiments, the light detector can include an array of detectors or detector elements. The LiDAR scanning system can further include an electrical processing and computing device electrically coupled to the light source and the light detector. The electrical processing and computing device can be configured to determine a distance from the LiDAR to an object. The distance to an object can be determined based on a time difference between transmitting the light pulse and detecting the corresponding scattered light. In some embodiments, the time intervals of consecutive light pulses may be smaller than the round-trip time for a light pulse to reach the farthest objects in a pre-determined distance according to the LiDAR system specification. Therefore the return light pulses (e.g., the scattered light) may arrive at the light detector in an order different from the order in which the corresponding light pulses are transmitted by the LiDAR system. In some embodiments, each of these pulses can be differentiated using an array of detector elements and/or using encoded signals.

In accordance with some embodiments, a light detection and ranging (LiDAR) scanning system is provided. The system includes a light source configured to transmit a light pulse; a beam steering apparatus configured to steer the light pulse in at least one of vertical and horizontal directions along an optical path; a light detector coupled to the beam steering apparatus, and an electrical processor and computer device electrically coupled to the light source and the light detector. The light detector comprises a plurality of detector elements and is configured to detect a scattered light generated based on the light pulse illuminating an object in the optical path. The electrical processor and computer device is configured to: obtain a location profile of the scattered light; based on the obtained location profile, obtain data relating to a movement of the beam steering apparatus; and based on the obtained data, determine a correlation between the transmitted light pulse and the detected scattered light.

In accordance with some embodiments, a computer-implemented method for operating a light detection and ranging (LiDAR) system, which comprises a light source, a beam steering apparatus, and a light detector having a plurality of detector elements, comprises: transmitting, with the light source, a light pulse; steering, with the beam steering apparatus, the light pulse in at least one of vertical and horizontal directions along an optical path; detecting, with the light detector, a scattered light generated based on the light pulse illuminating an object in the optical path; obtaining a location profile of the scattered light; based on the obtained location profile, obtaining data relating to a movement of the beam steering apparatus; and based on the obtained data, determining a correlation between the transmitted light pulse and the detected scattered light.

BRIEF DESCRIPTION OF THE DRAWINGS

For a better understanding of the various described aspects, reference should be made to the description below, in conjunction with the following figures in which like-referenced numerals refer to corresponding parts throughout the figures.

FIG. 1 illustrates a conventional LiDAR scanning system.

FIG. 3 illustrates an exemplary light detector including an array of detectors or detector elements according to examples of the disclosure.

DETAILED DESCRIPTION

Figure 2A:
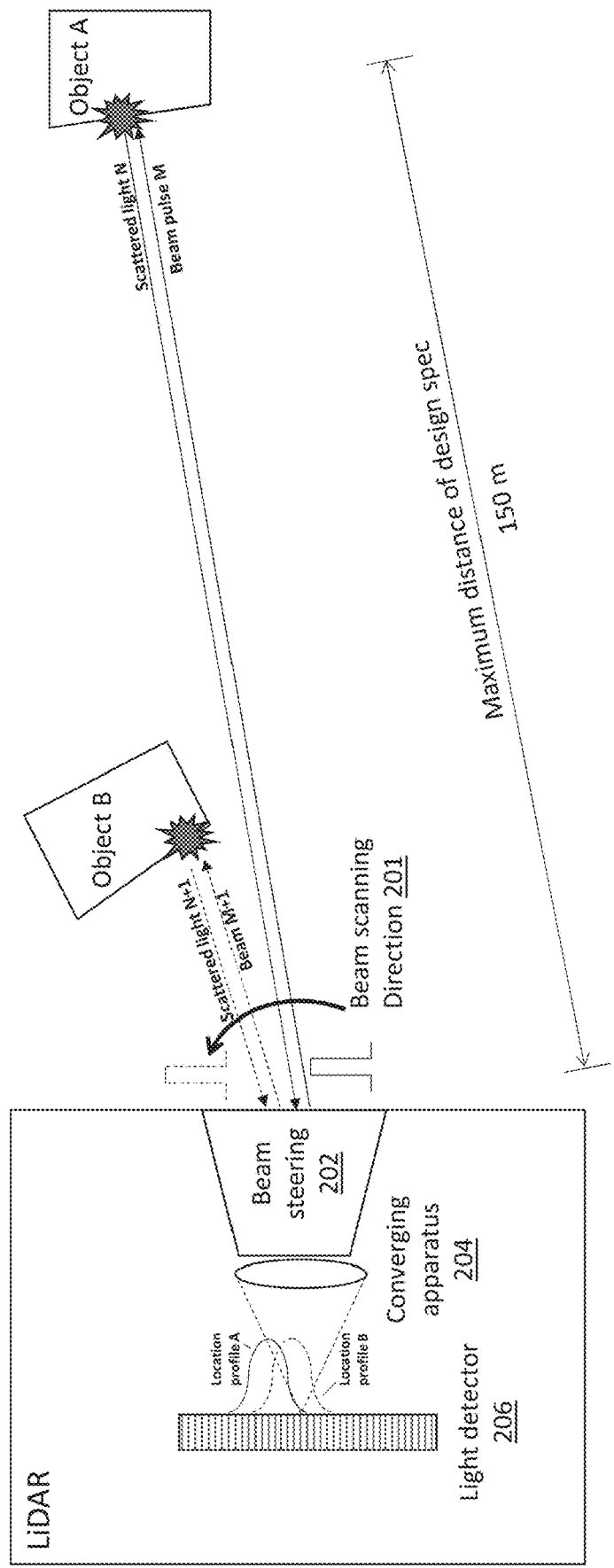
FIG. 2A illustrates an exemplary LiDAR scanning system according to examples of the disclosure.

One type of LiDAR system generates a short pulse of light, collimates it to a narrow beam, and sends it to a direction in the field of view. If the light pulse reaches an object, the scattered light is collected by the detector and the distance of the scattering spot can be calculated from the time the pulse is transmitted from the LiDAR and the time the scattered light pulse reaches the detector of the LiDAR. Through a beam steering mechanism, the direction of the light beam can raster in the field of view. An exemplary beam steering mechanism or apparatus is described in detail in the U.S. Provisional Patent Application No. 62/441,280 filed on Dec. 31, 2016, entitled "Coaxial Interlaced Raster Scanning System for LiDAR," and the U.S. Non-provisional patent application Ser. No. 15/721,127 filed on Sep. 29, 2017, entitled "2D Scanning High Precision LiDAR Using Combination of Rotating Concave Mirror and Beam Steering Devices," the content of which is incorporated herein in its entirety for all purposes.

In order to achieve a higher angular resolution, it is desirable to send out light pulses and detect the return light pulses (e.g., scattered light) in a high frequency (i.e., at smaller time intervals). However, in order to differentiate returning signals generated from consecutive light pulses, the shortest time interval between consecutive light pulses is limited by the maximum time it takes for a light pulse to travel round trip to the furthest distance the LiDAR is designed for. As shown in FIG. 1, a light pulse for beam position M+1 is transmitted after a light pulse for beam position M is transmitted. However, Object B, which scatters the later transmitted light pulse for beam position M+1, is closer to the LiDAR system than Object A, which scatters the earlier transmitted light pulse for beam position M. Thus, the light pulse for beam position M+1 may return (as scattered light N+1) before the light pulse for beam position M returns (as scattered light N), if the light pulse for beam position M+1 is transmitted before the scattered light N returns. As a result, it is difficult to differentiate between the return signals as to which return signal corresponds to which scattered light (e.g., scattered light from Object A or Object B).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR scanning systems will now be presented with reference to various elements of apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The present disclosure describes a LiDAR scanning system that is capable of scanning a light beam in at least one of the vertical or horizontal directions and transmitting light pulses in high frequency (i.e., at small time intervals) to achieve high resolution in the field of view.

In the following description of examples, reference is made to the accompanying drawings which form a part hereof, and in which is shown by way of illustration specific examples that can be practiced. It is to be understood that other examples can be used and structural changes can be made without departing from the scope of the disclosed examples.

Although the following description uses terms "first," "second," etc. to describe various elements, these elements should not be limited by the terms. These terms are only used to distinguish one element from another. For example, a first pulse signal could be termed a second pulse signal, and, similarly, a second pulse signal could be termed a first pulse signal, without departing from the scope of the various described embodiments. The first pulse signal and the second pulse signals are both pulse signals, but they may not be the same pulse signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Transmitting and detecting light pulses at a higher frequency (i.e., at smaller time intervals) results in higher resolution of image frames. Consider an example in which the predetermined maximum distance for LiDAR detection is about 150 meters and thus the maximum time for the round-trip flight of the light pulse is about 1 microsecond. In a conventional LiDAR scanning system (e.g., a single detector element LiDAR scanning system as shown in FIG. 1), the shortest time interval for consecutive light pulses is thus about 1 microsecond and thus the maximum number of points that can be collected by the detector per second is about 1 million points (i.e., 1 second/1 microsecond=1 million points). Thus, for a 20 frames per second ("fps") setting, the 1 million aggregating points are collected to form 20 frames, with points for each single frame being collected within a 50-millisecond window (i.e., 50 milliseconds per frame×20 fps=1 second). Accordingly, the maximum number of points in one frame is about 50,000 (i.e., 1 million points/20 frames). The number of points per frame indicates the resolution and it is desirable to increase the number of points per frame so as to increase the resolution. Thus, it is desirable to transmit and detect light pulses at smaller time intervals to obtain higher resolution in each frame.

FIG. 2A illustrates an exemplary LiDAR scanning system according to examples of the disclosure. In some embodiments, a LiDAR scanning system can include a light source, a beam steering apparatus 202, a light converging apparatus 204, a light detector 206, and an electrical processing and computing device (e.g., a microprocessor). The light source can be configured to transmit one or more light pulses (e.g., beam M, beam M+1). For example, the light source may be a laser source that emits or transmits laser pulses. The beam steering apparatus 202 can be configured to steer the one or more light pulses in at least one of vertical and horizontal directions along an optical path, and concurrently collect scattered light generated based on the one or more light pulses illuminating an object in the optical path. The scattered light can be coaxial or substantially coaxial with the optical path. In the depicted example, the beam steering apparatus steers the light pulses in a vertical direction as indicated by beam scanning direction 201.

Figure 2B:
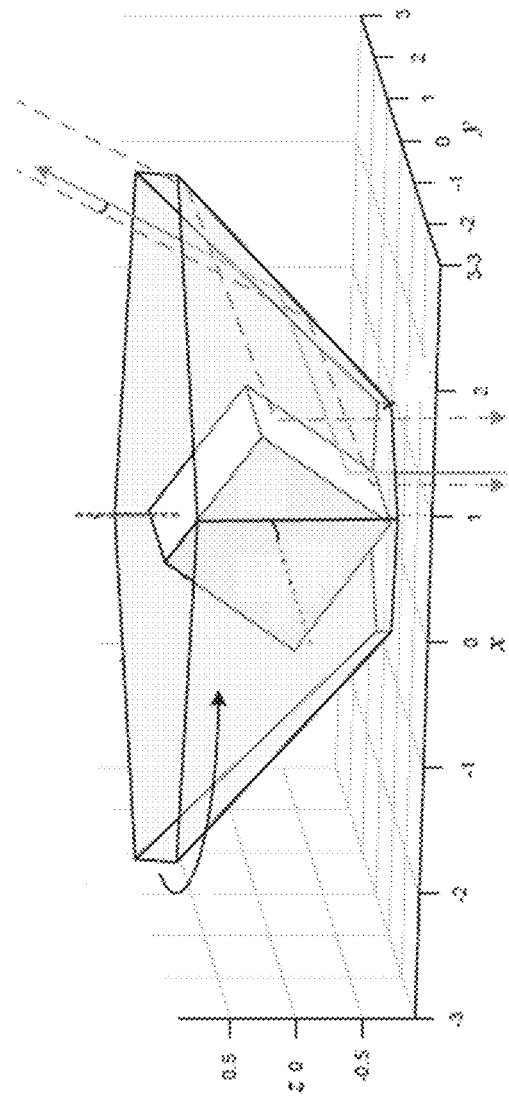
FIG. 2B illustrates an exemplary beam steering apparatus according to examples of the disclosure.

FIG. 2B illustrates an exemplary beam steering apparatus in a LiDAR scanning system according to some embodiments of the disclosure. As depicted, the beam steering apparatus includes a polyhedron reflector situated within the concave reflector that is aligned about a central axis. The concave reflector is configured to spin about the central axis. The polyhedron is configured to spin about a pivot in a direction perpendicular to the central axis. The respective instantaneous positions of the concave reflector and the polyhedron steer pulses of light to illuminate objects in a field of view, while collecting scattered light from the pulses of light scattered at the objects. Each transmitted pulse of light is coaxial or substantially coaxial with the collected scattered light from the corresponding pulse of light. The exemplary beam steering mechanism or apparatus is described in detail in the U.S. Provisional Patent Application No. 62/441,280 filed on Dec. 31, 2016, entitled "Coaxial Interlaced Raster Scanning System for LiDAR," and U.S. Non-provisional patent application Ser. No. 15/721,127, filed on Sep. 29, 2017, entitled "2D Scanning High Precision LiDAR Using Combination of Rotating Concave Mirror and Beam Steering Devices," the content of which is incorporated wherein in its entirety for all purposes. It should be appreciated by one of ordinary skill in the art that the above-described beam steering apparatus is exemplary and that techniques described herein to differentiate scattered lights may be used in conjunction with other types of beam steering apparatus.

Returning to FIG. 2A, the LiDAR system further includes a light converging apparatus 204 configured to direct the collected scattered light to a focal point or plane. In the depicted example in FIG. 2A, the light converging apparatus includes one or more optical lens devices that operate (e.g., focuses, disperses, modifies, splits, etc.) on lights. Using the light converging apparatus 204, the collected scattered light can be directed to a focal point or plane for light detection and/or image generation by the light detector 206, which is located in proximity to or at the focal point.

The light detector 206 includes a detector array that can be used to differentiate among the scattered light pulses collected in an order different from the order in which the corresponding light pulses were transmitted. As shown in FIG. 2A, the earlier transmitted pulse M is scattered by Object A, resulting in a scattered light N (among other scattered lights) that is coaxial or substantially coaxial with the transmitted light pulse M. The scattered light N is directed by the light converging apparatus 204 and lands on the light detector 206. Based on how the scattered light N lands on the detector array, the LiDAR system obtains a location profile A.

The location profile A can be used by the LiDAR system (e.g., the electrical processing and computing device of the LiDAR system) to determine which transmitted light pulse the scattered light N corresponds to. As discussed above, the beam steering apparatus 202 moves (e.g., rotates) in the beam scanning direction 201 during the round trip of the light pulse M. As such, when the scattered light N lands on the light detector 206, the location of the beam steering apparatus 202 (along with the light detector 206) has shifted from when the light pulse M was transmitted. Thus, the scattered light N lands on the light detector 206 at an angle different from the original angle between the light detector 206 and the transmitted pulse M. The angle at which the scattered light N lands on the light detector affects the location profile A. For example, if that the center of the landing area of the scattered light N would be at the center of the detector array had the beam steering apparatus 202 remained stationary, the center of the landing area would be a distance away from the center of the detector array because the beam steering apparatus 202 has moved during the roundtrip travel of the light pulse, directing the returning beam at a different angle. In some instances, a longer roundtrip travel by the light pulse corresponds to a larger movement of the beam steering apparatus 202, which in turn results in a longer distance of the center of the landing area of the scattered light away from the center of the detector array.

Thus, in operation, the LiDAR system (e.g., the electrical processing and computing device of the LiDAR system) can analyze the location profile of the collected scattered light to determine which transmitted light pulse the collected light corresponds to. In some embodiments, the LiDAR system first determines a weighted center of the landing area (on the detector array) based on the location of the landing area as imaged on the detector array and the signal intensity as detected by the detector element. The LiDAR system then determines the distance between the center of the landing area and the location where the scattered light would have landed had the light detector remained stationary ("shifting distance"). Based on the shifting distance, the LiDAR system can obtain information related to the movement of the beam steering apparatus 202, for example, the angle at which the returning beam lands at the light detector 206 shifted during the travel time of the light pulse (shifting angle=shifting distance/focal length). Based on the obtained movement information (e.g., shifting angle) and the known data on the movement of the beam steering apparatus 202 (e.g., the speed at which the beam steering apparatus moves), the LiDAR system can determine the approximate roundtrip travel time of the light pulse and, furthermore, differentiate whether the pulse is from the scattered light at Object A or Object B.

In some examples, the detector array can be placed at or near the focal plane of the light converging apparatus 206 (e.g., focusing lens) in the same direction as the fastest angle swiping direction. For example, the detector array may be disposed parallel to the light converging apparatus 204. Without beam steering or scanning, the scattered light spot in the field of view may be imaged on a few pixels in the detector array. In one example, if the focal length is about 5.3 centimeters and the diverging angle of the outgoing scanning laser beam is about 0.1° (i.e., the outgoing light beam is not a perfect parallel beam), the light spot imaged on the detector array is about 100 micrometers, assuming no significant optical aberrations.

FIG. 3 illustrates an exemplary light detector including an array of detectors or detector elements. The detector array can be an array of avalanche photodiode (APD) elements. In some embodiments, some or all the APD elements can be implemented on a same die of a semiconductor wafer, and isolated with etched trenches filled with isolation material. In some embodiments, the detector array can be implemented by placing and packaging multiple already-diced discrete APDs closely to each other. The pitch of the detector array can be, for example, 20 micrometers, with one to two micrometers isolation in between neighboring APD elements. Therefore, for the 100 micrometers light spot landing on the detector array, the center of the vertical position of the light spot can be calculated based on curving-fitting of the signal intensity of the detector array signal.

Figure 5:
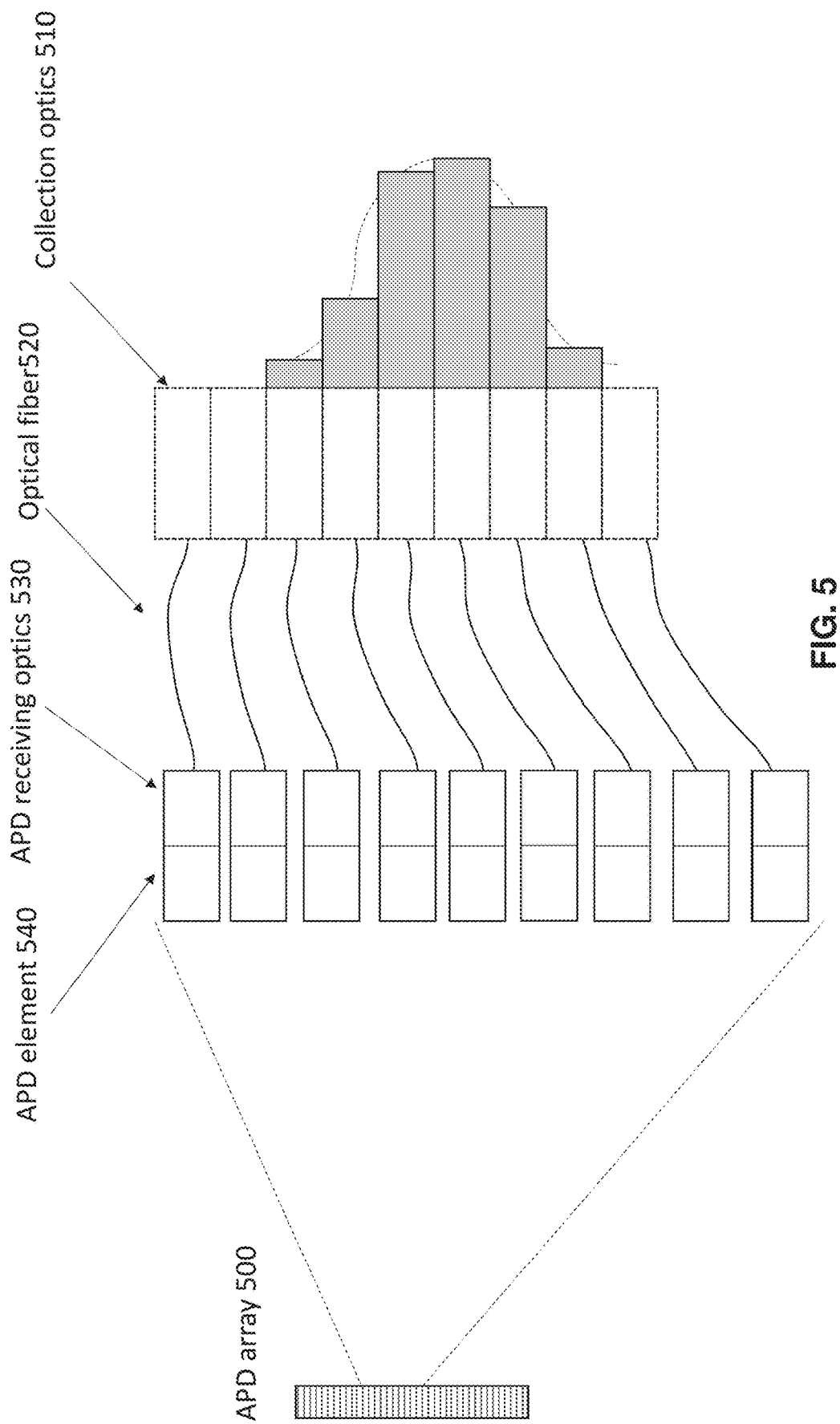
FIG. 5 illustrates another exemplary light detector including an array of detectors or detector elements according to examples of the disclosure.

FIG. 5 illustrates another exemplary light detector. An optional collection optics 510 collects and directs the light illuminating at its receiving area to the tip of the optical fiber 520. This light signal transmits through and emits at the other end of the optical fiber 520, gets collected by the APD receiving optics 530 directed to the APD element 540. Multiple modules of collection optics 510 can be aligned together to form a one- or two-dimensional array where the receiving areas of these modules are aligned next to each other with gaps as small as possible in between the receiving areas.

Using a detector array, the time interval between the consecutive light pulses of a laser beam (e.g., beam M and beam M+1) can be configured to be less than the round-trip time for a light pulse to reach the farthest objects in a pre-determined distance according to the LiDAR system specification. For example, the time interval between the consecutive light pulses can be 0.1 microseconds, such that the maximum number of points in one frame for a 20 fps setting can be 500,000. This can significantly increase the resolution in each frame.

As an example of using a detector array in a LiDAR scanning system, the beam steering apparatus may steer the laser beam at a very high speed of 0.36° per microseconds. For a first light pulse that reaches an object positioned at 150 meters away, the round-trip travel time is about 1 microsecond. Accordingly due to the beam steering or scanning, at the time that the scattered light of this first light pulse reaches the detector, it is as if it is from about 0.36° away from the optical axis, thus reaching the detector array at about 360 micrometers away from the center of the detector array. As illustrated in FIG. 2A, assuming at time 0, the first light pulse at beam position M is transmitted from the LiDAR. This first light pulse reaches Object A at 150 meters away. Thus, at time 1 microseconds, the scattered light generated based on the first light pulse reaches the detector array, at about 360 micrometers away from the center of the detector array. At time 0.1 microseconds, a second light pulse at beam position M+1 is transmitted from the LiDAR. This second pulse reaches Object B at 30 meters away. Thus, at time 0.2 microseconds, this second pulse's scattered light reaches the detector array, earlier than the scattered light from the first pulse. However, because the image of the scattered light generated based on this second light pulse lands at about 72 micrometers away from the center position of the detector array, it can be easily differentiated from the image of the scattered light generated based on the first pulse.

In some embodiments, when the LiDAR system receives multiple scattered lights after transmitting a pulse signal, the LiDAR system can determine multiple candidate travel times (i.e., the time of flight) corresponding to the multiple scattered lights by calculating the time differences between the time of transmission and the times when the scattered lights are detected. From the multiple candidate travel times, one candidate travel time can be selected to calculate the distance. Specifically, for each of the detected scattered lights, a shifting distance, a shifting angle, and a travel time can be determined based on the landing area of the scattered light on the detector array in the manner described above. The system can then compare, for each scattered light, the candidate travel time (calculated via direct measurement of time) with the travel time calculated based on the landing area of the scattered light. For the scattered light that actually corresponds to the transmitted pulse signal, the candidate travel time and the travel time calculated based on the landing area should be similar or identical. Thus, after the comparisons, the system can select the candidate travel time for which the comparison has yielded the smallest difference and use the selected candidate travel time to calculate a distance.

In some embodiments, when the LiDAR system receives multiple scattered lights after transmitting a pulse signal, the LiDAR system can determine multiple candidate travel times (i.e., the time of flight) corresponding to the multiple scattered lights using the geometry, angle, electrical phase, and/or electrical frequency of the scattered lights). From the multiple candidate travel times, one candidate travel time can be selected. Specifically, for each of the detected scattered lights, a shifting distance, a shifting angle, and a travel time can be determined based on the landing area of the scattered light in the manner described above. The system can then compare, for each scattered light, the candidate travel time and the travel time calculated based on the landing area of the scattered light. For the scattered light that actually corresponds to the transmitted pulse signal, the candidate travel time and the travel time calculated based on the landing area should be similar or identical. Thus, after the comparisons, the system can select the candidate travel time for which the comparison has yielded the smallest difference and use the selected candidate travel time to calculate a distance.

Figure 4:
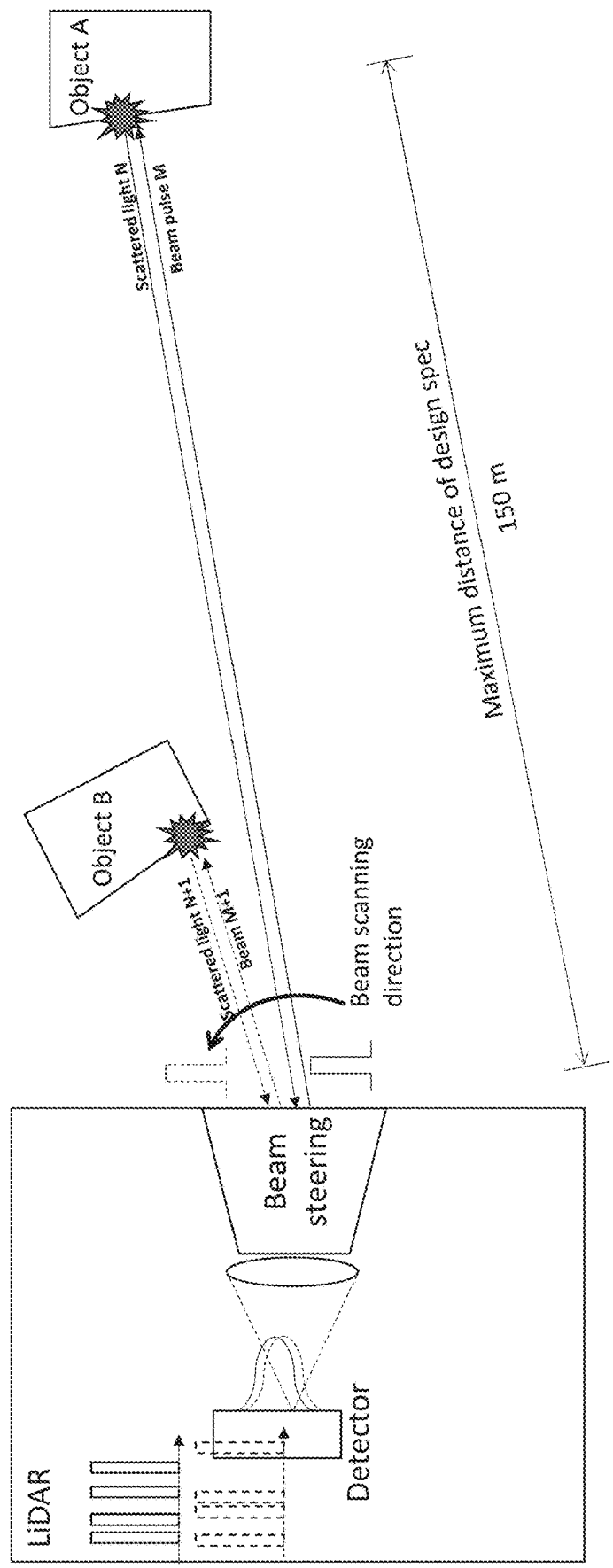
FIG. 4 illustrates another exemplary LiDAR scanning system according to examples of the disclosure.

FIG. 4 illustrates another exemplary LiDAR scanning system according to examples of the disclosure. The LiDAR scanning system illustrated in FIG. 4 can include components similar to those describes above with respect to FIGS. 2 and 3. In addition or alternatively, as illustrated in FIG. 4, each of the light pulse transmitted from the LiDAR scanning system can be encoded (e.g., using pseudorandom binary sequence "PRBS" code) and thus include encoding information that differentiates one light pulse from another. The encoded light pulse reaches an object and scattered light is generated. The scattered light is thus also encoded. The light detector can decode such encoding information in the received scattered light, therefore mapping it or correlate it back to a particular transmitted light pulse that has the same encoding information. As a result, the light detector can uniquely identify each scattered light pulse in the a plurality of scattered light pulses despite that the scattered light pulses may reach the detector (e.g., a detector array) at a sequence different from the sequence their corresponding light pulses were transmitted from the LiDAR scanning system. The details of the light pulse encoding and decoding are described in detail in the co-pending U.S. Provisional Patent Application No. 62/442,758 filed on Jan. 5, 2017, entitled "METHOD AND SYSTEM FOR ENCODING AND DECODING LIDAR," the content of which is incorporated herein in its entirety for all purposes.

What is claimed is:

1. A light detection and ranging (LiDAR) scanning system, comprising:
   a light source configured to transmit a light pulse;
   a beam steering apparatus configured to steer the light pulse in at least one of vertical and horizontal directions along an optical path and to collect a scattered light, wherein the scattered light is generated based on the light pulse illuminating an object in the optical path;

a light detector coupled to the beam steering apparatus, wherein the light detector comprises a plurality of detector elements and is configured to detect the scattered light; and an electrical processor and computer device electrically coupled to the light source and the light detector, the electrical processor and computer device being configured to:

obtain a location profile of the scattered light on the light detector;

based on the obtained location profile, obtain data relating to a movement of the beam steering apparatus; and based on the obtained data, determine a correlation between the transmitted light pulse and the detected scattered light.

2. The LiDAR scanning system of claim 1, wherein the electrical processor and computer device is further configured to determine a distance to the object.

3. The LiDAR scanning system of claim 1, wherein the location profile is indicative of whether a detector element of the detector elements detected the scattered light and an associated signal intensity.

4. The LiDAR scanning system of claim 1, wherein the electrical processor and computer device is further configured to, based on the location profile, determine a center of a landing area of the scattered light.

5. The LiDAR scanning system of claim 4, wherein the electrical processor and computer device is further configured to, based on the center of the landing area, determine a shifting distance.

6. The LiDAR scanning system of claim 5, wherein the electrical processor and computer device is further configured to, based on the shifting distance, determine a shifting angle.

7. The LiDAR scanning system of claim 6, wherein the electrical processor and computer device is further configured to, based on the shifting angle, determine a travel time of the transmitted pulse.

8. The LiDAR scanning system of claim 6, wherein the electrical processing and computing device is further configured to:

determine a candidate travel time based on a time at which the light pulse is transmitted and a time at which the scattered light is detected;

compare the candidate travel time with the travel time determined based on the shifting angle;

based on the comparison, determine a correlation between the transmitted light pulse and the detected scattered light; and calculate a distance to the object based on the candidate time.

9. The LiDAR scanning system of claim 8, wherein the information includes the geometry, angle, electrical phase, electrical frequency, or any combination thereof.

10. The LiDAR scanning system of claim 6, wherein the electrical processing and computing device is further configured to:

determine a candidate travel time based on information related to the scattered light;

compare the candidate travel time with the travel time determined based on the shifting angle;

based on the comparison, determine a correlation between the transmitted light pulse and the detected scattered light; and calculate a distance to the object based on the candidate time.

11. The LiDAR scanning system of claim 1, where the light source is configured to consecutively transmit light pulses at a time interval that is smaller than the time it takes for the round trip of time of flight for a light pulse to reach the farthest of the objects per the design specification of the system.

12. The LiDAR scanning system of claim 1, further comprising a light converging apparatus configured to direct the collected scattered light to a focal point.

13. The LiDAR scanning system of claim 1, wherein the light detector is disposed at or in proximity to a focal point.

14. The LiDAR scanning system of claim 1, where the transmitted pulse includes encoding information.

15. A computer-implemented method for operating a light detection and ranging (LiDAR) system, the LiDAR system having a light source, a beam steering apparatus, and a light detector having a plurality of detector elements, the method comprising:

transmitting, with the light source, a light pulse;

steering, with the beam steering apparatus, the light pulse in at least one of vertical and horizontal directions along an optical path;

collecting, with the beam steering apparatus, a scattered light generated based on the light pulse illuminating an object in the optical path;

detecting, with the light detector, the scattered light;

obtaining a location profile of the scattered light on the light detector;

based on the obtained location profile, obtaining data relating to a movement of the beam steering apparatus; and based on the obtained data, determining a correlation between the transmitted light pulse and the detected scattered light.

* * * * *

UNITED STATES PATENT AND TRADEMARK OFFICE
CERTIFICATE OF CORRECTION

PATENT NO. : 11,054,508 B2
APPLICATION NO. : 15/857563
DATED : July 6, 2021
INVENTOR(S) : Yimin Li and Junwei Bao It is certified that error appears in the above-identified patent and that said Letters Patent is hereby corrected as shown below:

In the Claims

In Column 9:
Claim 1, Line 8, "electrical processor and computer device" should read --electrical processing and computing device--;
Claim 1, Line 10, "electrical processor and computer device" should read --electrical processing and computing device--;
Claim 2, Line 21, "electrical processor and computer device" should read --electrical processing and computing device--;
Claim 3, Line 25, "the detector elements" should read --the plurality of detector elements--;
Claim 4, Line 28, "electrical processor and computer device" should read --electrical processing and computing device--;
Claim 5, Line 32, "electrical processor and computer device" should read --electrical processing and computing device--;
Claim 6, Line 36, "electrical processor and computer device" should read --electrical processing and computing device--;
Claim 7, Line 40, "electrical processor and computer device" should read --electrical processing and computing device--;
Claim 7, Line 42, "the transmitted pulse" should read --the transmitted light pulse--; and
Claim 8, Line 43, "The LiDAR scanning system of claim 6" should read --The LiDAR scanning system of claim 7--.

In Column 10:
Claim 8, Lines 1-2, "candidate time" should read --candidate travel time--;
Claim 11, Line 18, "where" should read --wherein--;
Claim 11, Lines 20-22, "the time it takes for the round trip of time of flight for a light pulse to reach the farthest of the objects per the design specification" should read --a round-trip time of flight for a light pulse to reach a farthest object of a plurality of objects per a design specification--; and
Claim 14, Line 30, "transmitted pulse" should read --transmitted light pulse--.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*